(12) United States Patent
Imai

(10) Patent No.: US 9,103,554 B2
(45) Date of Patent: Aug. 11, 2015

(54) HOT-WATER STORAGE TYPE HEATING UNIT

(75) Inventor: Seishia Imai, Nagoya (JP)

(73) Assignee: RINNAI CORPORATION, Nagoya-Shi (JP)

(*) Notice: Subject to any disclaimer, the term of this patent is extended or adjusted under 35 U.S.C. 154(b) by 0 days.

(21) Appl. No.: 13/822,660

(22) PCT Filed: Oct. 20, 2010

(86) PCT No.: PCT/JP2010/068472
§ 371 (c)(1),
(2), (4) Date: Mar. 13, 2013

(87) PCT Pub. No.: WO2012/053072
PCT Pub. Date: Apr. 26, 2012

(65) Prior Publication Data
US 2013/0181060 A1    Jul. 18, 2013

(51) Int. Cl.
*F24D 3/02* (2006.01)
*F24D 19/10* (2006.01)
(Continued)

(52) U.S. Cl.
CPC .............. *F24D 3/02* (2013.01); *F24D 3/1075* (2013.01); *F24D 3/14* (2013.01); *F24D 11/0214* (2013.01);
(Continued)

(58) Field of Classification Search
CPC . F25B 2339/047; F24D 3/02; F24D 11/0214; F24D 3/1075; F24D 3/10; F24D 3/1058; F24D 3/08; F24D 3/082; F24D 3/087; F24D 17/02; F24D 19/1039; F24D 2200/12
USPC .................................................. 237/63, 2 B
See application file for complete search history.

(56) References Cited

U.S. PATENT DOCUMENTS 3,180,577 A * 4/1965 Braun .............................. 237/63
3,290,864 A * 12/1966 Harker et al. ................... 237/63
(Continued)

FOREIGN PATENT DOCUMENTS

EP    2 199 702    6/2010
JP    61-213442    9/1986
(Continued)

OTHER PUBLICATIONS

Imai et al, JP 2008-224076 A English machine translation, Sep. 25, 2008.*
(Continued)

*Primary Examiner* — Alissa Tompkins
*Assistant Examiner* — Phillip E Decker
(74) *Attorney, Agent, or Firm* — Rankin, Hill & Clark LLP

(57) ABSTRACT

In a hot-water storage type heating unit 1, a liquid-liquid heat exchanger 15, which exchanges heat between a first hot-water circulation circuit 12 through which hot water stored in a hot-water storage tank 11 circulates and a heating circulation circuit 14 in which the hot water flows from a radiator unit 3 for heating, is disposed above the hot-water storage tank 11, and a circulation pump 16 is disposed in the first hot-water circulation circuit 12 on the downstream side of the liquid-liquid heat exchanger 15. In order to return the gas, which is separated by a gas-liquid separator 17 provided so as to be interposed in the first hot-water circulation circuit 12 between the liquid-liquid heat exchanger 15 and the circulation pump 16, to the hot-water storage tank 11, a return passage 18 which communicates between the hot-water storage tank 11 and the gas-liquid separator 17 is provided.

6 Claims, 3 Drawing Sheets

(51) Int. Cl.
*F24D 11/02* (2006.01)
*F24D 3/10* (2006.01)
*F24D 3/14* (2006.01)

(52) U.S. Cl.
CPC ......... *F24D 19/1039* (2013.01); *F24D 2200/12* (2013.01); *F24D 2220/06* (2013.01); *Y02B 30/126* (2013.01)

(56) References Cited

U.S. PATENT DOCUMENTS

| | | | | |
|---|---|---|---|---|
| 4,153,104 | A * | 5/1979 | Ruder | 237/1 R |
| 4,296,729 | A * | 10/1981 | Cooper | 165/236 |
| 5,732,880 | A * | 3/1998 | Langen et al. | 237/12.3 B |
| 6,129,523 | A * | 10/2000 | Ruhnke | 237/63 |
| 6,275,655 | B1 | 8/2001 | Rixen | 392/496 |
| 6,835,307 | B2 * | 12/2004 | Talbert et al. | 165/200 |
| 7,654,414 | B2 * | 2/2010 | Hiranaga et al. | 222/61 |
| 8,585,449 | B1 * | 11/2013 | Mcchesney et al. | 440/61 R |
| 2006/0144047 | A1 * | 7/2006 | Inaba et al. | 60/618 |
| 2010/0229583 | A1 * | 9/2010 | Komori et al. | 62/238.7 |
| 2012/0222631 | A1 * | 9/2012 | Lesage et al. | 122/18.5 |

FOREIGN PATENT DOCUMENTS

| | | | |
|---|---|---|---|
| JP | 9-299709 A * | 11/1997 | |
| JP | 2004-125301 | 4/2004 | |
| JP | 2004101134 A * | 4/2004 | F24H 1/18 |
| JP | 2008-224076 | 9/2008 | |
| JP | 2008-292067 | 12/2008 | |
| JP | 2009-052758 | 3/2009 | |
| KR | 92-7345 B1 * | 8/1992 | |

OTHER PUBLICATIONS

Iwata et al, JP 2004-125301 A English machine translation, Apr. 22, 2004.*
Park, et al, KR920007345 B1 English abstract, Aug. 31, 1992.*
European Search Report dated May 27, 2014.

* cited by examiner

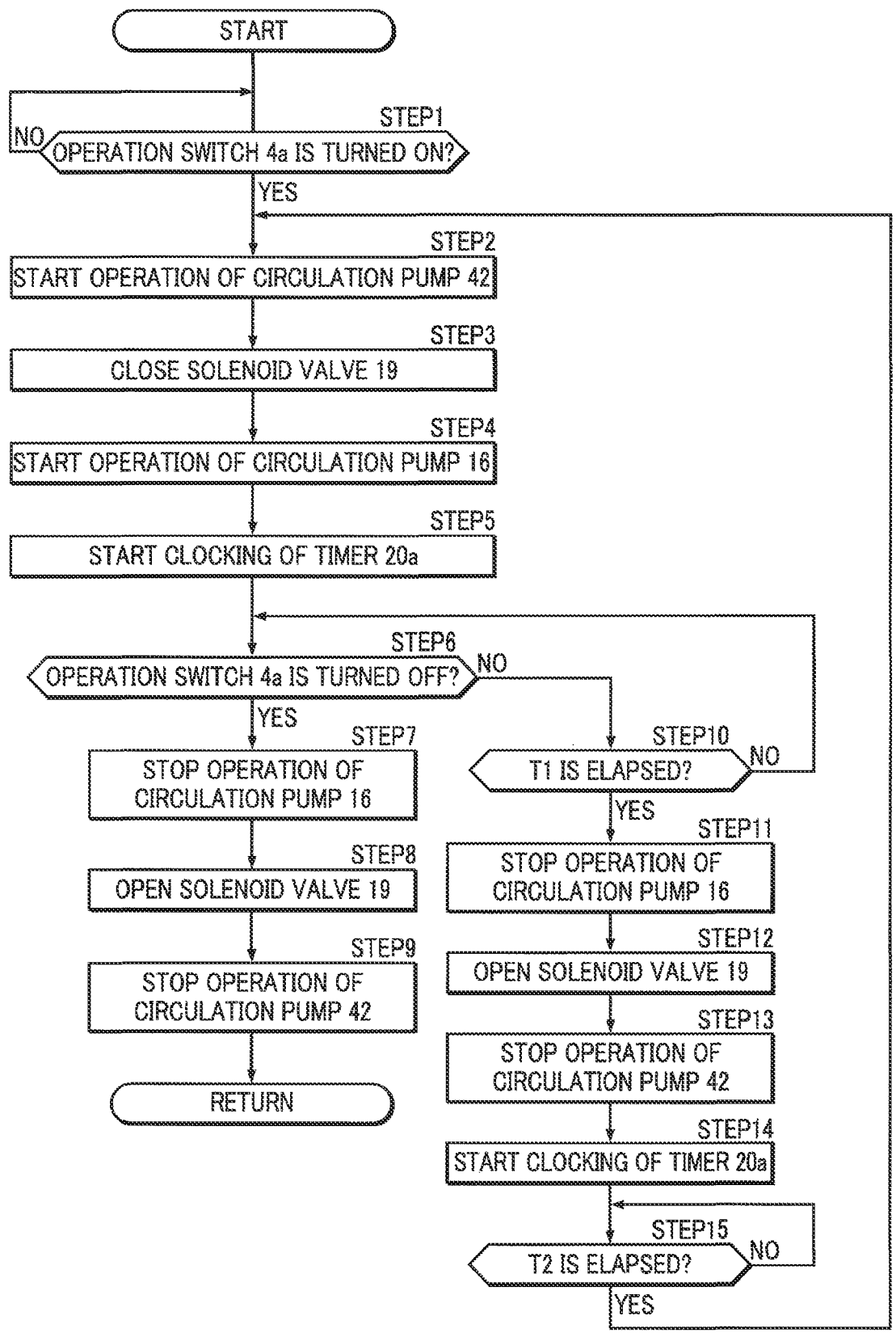

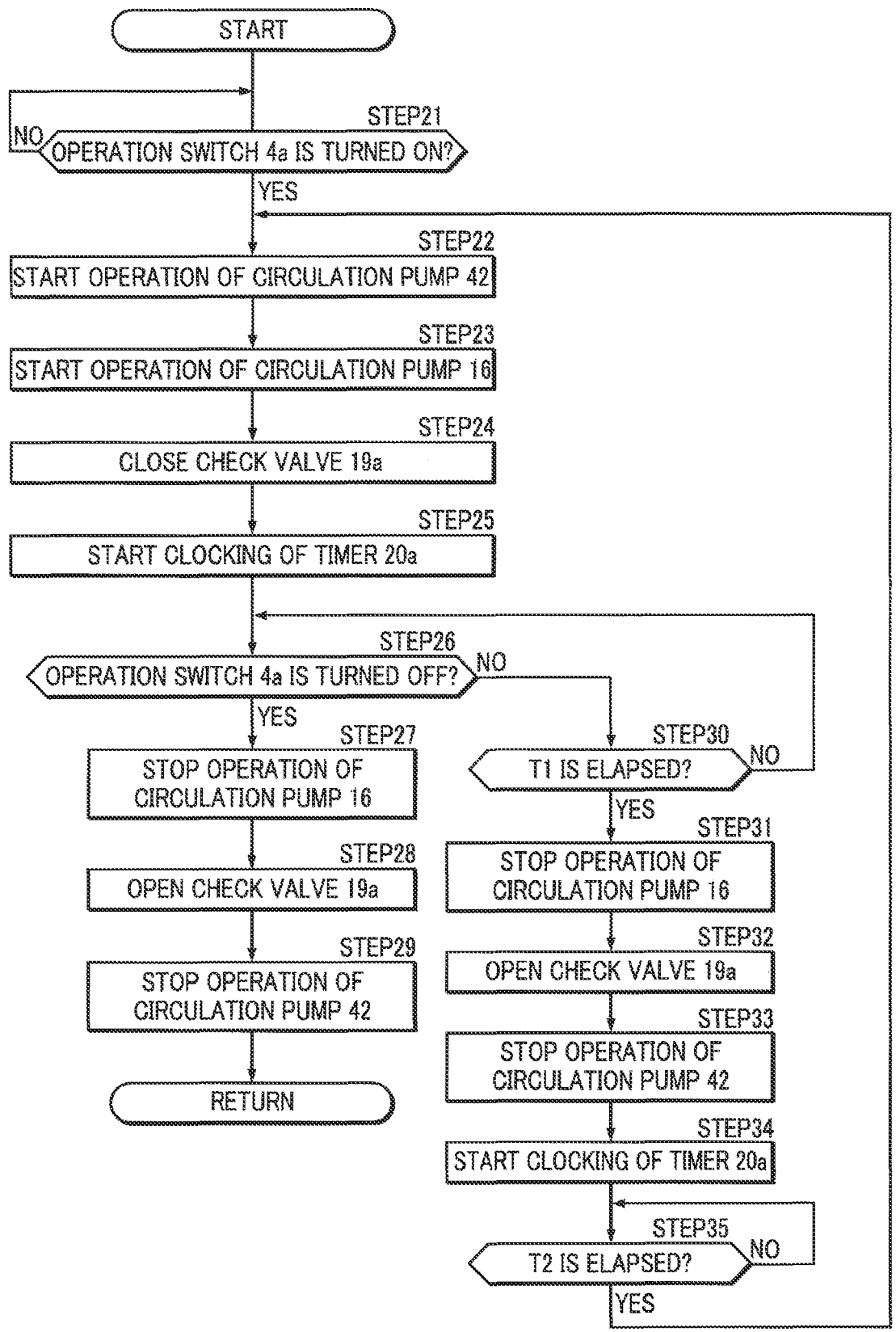

HOT-WATER STORAGE TYPE HEATING UNIT

TECHNICAL FIELD

The present invention relates to a hot-water storage type heating unit, and particularly, to a hot-water storage type heating unit including a liquid-liquid heat exchanger.

BACKGROUND ART

In the related art, a hot-water storage type heating unit is known which includes a hot-water storage tank which stores hot water in the inner portion, a hot-water circulation circuit through which the hot water stored in the hot-water storage tank circulates, a radiation circuit to which a radiator is connected and through which a heating medium flows, a liquid-liquid heat exchanger which exchanges heat between the hot water which circulates through the hot-water circulation circuit and the heating medium which flows through the radiation circuit, and a pump which is disposed in the hot-water circulation circuit on the downstream side of the liquid-liquid heat exchanger and circulates the hot water in the hot-water circulation circuit.

For example, Patent Document 1 discloses that hot water in a hot-water storage tank is heated by a heat pump, heat is exchanged between the heated hot water and water supplied from a water supply pipe by a liquid-liquid heat exchanger, and the hot water is supplied. Since the hot water with a high temperature is stored in the upper portion of the hot-water storage tank, the hot water is sucked from the upper portion of the hot-water storage tank and is supplied to the liquid-liquid heat exchanger.

In this configuration, if the liquid-liquid heat exchanger is disposed above the hot-water storage tank, air stays in the liquid-liquid heat exchanger, the staying air flows and reaches the pump, and there is a problem in that the pump causes failure of air entrainment. Meanwhile, since various devices such as a circulation pump are disposed below the hot-water storage tank and the space is not enough, if the liquid-liquid heat exchanger is disposed below the hot-water storage tank, a base which lifts the hot-water storage tank is required. Thereby, the center of gravity of the hot-water storage tank rises, the hot-water storage tank becomes unstable, and there is a problem in that drainage of the hot-water storage tank is difficult. Therefore, the liquid-liquid heat exchanger is disposed on the Side of the hot-water storage tank.

PRIOR ART DOCUMENT

Patent Document

Patent Document 1: Japanese Patent Application Laid-Open No. 2008-224076

SUMMARY OF THE INVENTION

Problem to be Solved by the Invention

However, if the liquid-liquid heat exchanger is disposed on the side of the hot-water storage tank, an installation area of the hot-water storage type heating unit is increased, and there is a problem in that the installation of the hot-water storage type heating unit is limited.

The invention is made in consideration of the above-described circumferences, and an object thereof is to provide a hot-water storage type heating unit which has a small installation area.

Means for Solving the Problem

A hot-water storage type heating unit according to the present invention includes: a hot-water storage tank which stores hot water in an inner portion thereof; a hot-water circulation circuit through which the hot water stored in the hot-water storage tank circulates; a radiation circuit to which a radiator is connected and in which a heating medium flows; a liquid-liquid heat exchanger which exchanges heat between the hot water which circulates through the hot-water circulation circuit and the heating medium which flows in the radiation circuit, and is disposed above the hot-water storage tank; a pump which is disposed in the hot-water circulation circuit on the downstream side of the liquid-liquid heat exchanger, and circulates the hot water in the hot-water circulation circuit; a gas-liquid separator which is provided so as to be interposed in the hot-water circulation circuit between the liquid-liquid heat exchanger and the pump; and a return passage which communicates with the hot-water storage tank and the gas-liquid separator, and returns gas separated by the gas-liquid separator to the hot-water storage tank.

In the hot-water storage type heating unit, since the liquid-liquid heat exchanger is disposed above the hot-water storage tank, compared to a case where the liquid-liquid heat exchanger is disposed on the side of the hot-water storage tank, an installation area is decreased.

However, if the liquid-liquid heat exchanger is disposed above the hot-water storage tank, air stays in the liquid-liquid heat exchanger, and the staying air flows to the hot-water circulation circuit. Thus, the gas-liquid separator is provided so as to be interposed in the hot-water circulation circuit between the liquid-liquid heat exchanger and the pump, and the air which flows in the hot-water circulation circuit is separated by the gas-liquid separator. Thereby, the air reaching the pump and the pump causing failure of air entrainment are prevented. In addition, since volume of the gas-liquid separator is smaller than that of the liquid-liquid heat exchanger, even when the gas-liquid separator is disposed on the side of the hot-water storage tank, the installation area is decreased.

Moreover, in the hot-water storage type heating unit according to the present invention, it is preferable that an on-off valve, which is provided in the return passage and closes the return passage during the operation of the pump, be provided, and the gas-liquid separator include an air storage chamber on an upper portion thereof.

In this case, when the pump is operated, the on-off valve closes the return passage through which the air separated by the gas-liquid separator is returned to the hot-water storage tank. Thereby, when the hot-water is sucked from the hot-water storage tank and is supplied to the hot-water circulation circuit, the separated air is temporarily stored in the air storage chamber of the upper portion of the gas-liquid separator, and thus, the air returned to the hot-water storage tank from the return passage is prevented from being supplied to the hot-water circulation circuit as it is. Thereby, it is possible to decrease the air which flows in the hot-water circulation circuit.

Moreover, the radiator releases amount of heat of the heating medium which flows in the radiation circuit, and includes a hot-water supply device in addition to a heater such as a floor heater or a warm-air heater. Moreover, the radiation circuit includes a circuit in which water, which is supplied from one end and is a heating medium, is heated by a liquid-liquid heat exchanger and hot-water is discharged from the other end, other than the circulation circuit, in addition to a circuit in which the heating medium circulates through the inner portion.

In addition, in the hot-water storage type heating unit according to the present invention, it is preferable that a hot-water inlet port of the hot-water circulation circuit be positioned below a hot-water surface of the hot-water storage tank.

In this case, since air above the hot-water surface is prevented from being sucked from the hot-water inlet port into the hot-water circulation circuit, it is possible to further decrease the air which flows in the hot-water circulation circuit.

BRIEF DESCRIPTION OF DRAWINGS

FIG. 2 is an operation flowchart of the hot-water storage type heating system when a heating operations starts.

FIG. 3 is an operation flowchart when a heating operation starts in a hot-water storage type heating system which includes a hot-water storage type heating unit according to another embodiment of the present invention.

MODE FOR CARRYING OUT THE INVENTION

Figure 1:
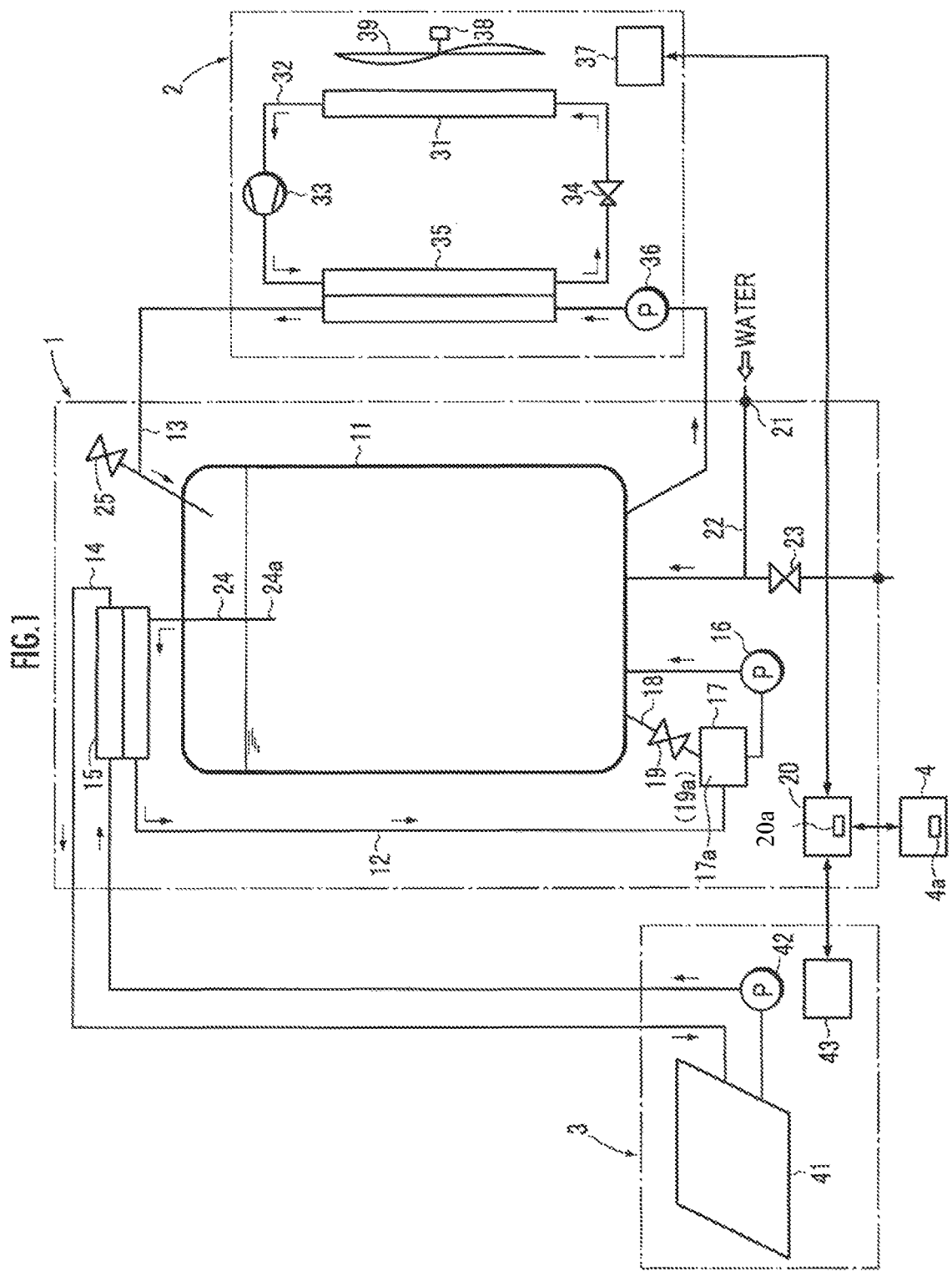
FIG. 1 is schematic overall configuration view of a hot-water storage type heating system which includes a hot-water storage type heating unit according to an embodiment of the present invention.

A hot-water storage type heating system which includes a hot-water storage type heating unit 1 according to an embodiment of the present invention will be described with reference to drawings.

As illustrated in a schematic overall configuration view of FIG. 1, the hot-water storage type heating system includes a hot-water storage type heating unit 1, a heat pump unit 2, a radiator unit 3 for heating (radiator), and a remote controller 4.

The hot-water storage type heating unit 1 includes a hot-water storage tank 11, a first hot-water circulation circuit (hot-water circulation circuit) 12, a second hot-water circulation circuit 13, a heating circulation circuit (radiation circuit) 14, a liquid-liquid heat exchanger 15, a circulation pump (pump) 16, a gas-liquid separator 17, a return passage 18, a solenoid valve (on-off valve) 19, a main controller 20, and the like.

The hot-water storage tank 11 stores hot water so as to keep the temperature of the hot water in the inner portion. A water supply pipe 22 which communicates with a water supply via a water supply port 21 communicates with the bottom portion of the hot-water storage tank 11, and supplies water into the hot-water storage tank 11 via the water supply pipe 22. A drain valve 23 is provided in the lower portion of the hot-water storage tank 11, an operator opens the drain valve 23 manually, and thus, the hot water in the hot-water storage tank 11 is able to be drained.

One end of the first hot-water circulation circuit 12 communicates with the lower portion of the hot-water storage tank 11, and the first hot-water circulation circuit 12 includes a lead-out pipe 24, which is disposed on the upper portion of the hot-water storage tank 11, in the other end of the circulation circuit 12. The hot water with a high temperature which is stored in the upper portion of the hot-water storage tank 11 is led-out from the lead-out pipe 24, circulates through the first hot-water circulation circuit 12, and is returned to the lower portion of the hot-water storage tank 11. An inlet port 24a of the lead-out pipe 24 is positioned below the hot-water surface of the hot-water storage tank 11, and thus, air above the hot-water surface is prevented from being led-out from the inlet port 24a to the first hot-water circulation circuit 12. The lead-out pipe 24 is configured of a straw-like elongated tube, and an inlet port 24a is provided so as to be opened in the lower end surface of the lead-out pipe 24.

In the second hot-water circulation circuit 13, one end communicates with the lower portion of the hot-water storage tank 11 and the other end communicates with the upper portion of the hot-water storage tank 11 respectively, and the heat pump unit 2 is provided so as to be interposed between one end and the other end. The hot water (or water) with a low temperature which is stored in the lower portion of the hot-water storage tank 11 is led-out, circulates through the second hot-water circulation circuit 13, is heated by the heat pump unit 2, becomes the hot water with a high temperature, and is returned to the upper portion of the hot-water storage tank 11. A safety valve 25 is provided in the second hot-water circulation circuit 13 of the downstream side of the heat pump unit 2 above the hot-water storage tank 11, and prevents the inner pressure of the hot-water storage tank 11 from exceeding a withstand pressure.

The heating circulation circuit 14 is a radiation circuit to which the radiator unit 3 for heating is connected, and a heating medium flows in the heating circulation circuit 14. Here, the heating medium is water. However, antifreezing fluid other than the water may be the heating medium. Moreover, here, the radiator unit 3 for heating is provided so as to be interposed in the heating circulation circuit 14, and water circulates the inner portion of the heating circulation circuit 14.

The liquid-liquid heat exchanger 15 is disposed above the hot-water storage tank 11, and heat is exchanged between the hot water which circulates through the first hot-water circulation circuit 12 and the water (hot water with a low temperature or water with a low temperature) which flows in the heat circulation circuit 14. The hot water with a high temperature stored in the hot-water storage tank 11 is introduced to the liquid-liquid heat exchanger 15 via the first hot-water circulation circuit 12. The water which flows in the heating circulation circuit 14 is heated and the temperature is increased by the heat of the hot water with a high temperature which flows in the first hot-water circulation circuit 12 introduced to the liquid-liquid heat exchanger 15, and flows toward the radiator unit 3 for heating. For example, in the liquid-liquid heat exchanger 15, the first hot-water circulation circuit 12 and the heating circulation circuit 14 of the inner portion are continuously connected to each other via a copper plate having high thermal conductivity and are configured so as to be meandered.

The circulation pump 16 is disposed in the first hot-water circulation circuit 12 on the downstream side of the liquid-liquid heat exchanger 15, and circulates the hot water in the first hot-water circulation circuit 12. Here, the circulation pump 16 is disposed below the hot-water storage tank 11.

The gas-liquid separator 17 is provided so as to be interposed in the first hot-water circulation circuit 12 between the liquid-liquid heat exchanger 15 and the circulation pump 16, and separates air contained in the hot water which circulates through the first hot-water circulation circuit 12. The speed of the hot water in the gas-liquid separator 17 is decreased, and thus, air in the hot water is separated and moves to the top. The separated air is accumulated in an air storage chamber 17a positioned at the upper portion of the gas-liquid separator 17. Here, the gas-liquid separator 17 is disposed below the hot-water storage tank 11.

For example, the gas-liquid separator 17 separates the air which is generated (precipitated) by a decrease of solubility due to a temperature increase of the hot water, and separates the air in the hot water by decreasing the flow velocity of the hot water by enlarging a cross-sectional area of a portion of the pipe which is interposed in the first hot-water circulation circuit 12 and by generating the flow in the direction reverse to the rising of the bubbles. However, the configuration of the gas-liquid separator 17 is not limited to this.

The return passage 18 communicates with the air storage chamber 17a of the upper portion of the gas-liquid separator 17 and the lower portion of the hot-water storage tank 11. The air accumulated in the air storage chamber 17a is returned to the hot-water storage tank 11 via the return passage 18.

The solenoid valve 19 which is an on-off valve is provided in the return passage 18, and opening and closing (communication and block of return passage 18) of the return passage 18 are carried out. Here, the solenoid valve 19 is a normally-open solenoid valve, and closes the return passage 18 when receiving a closing signal.

The main controller 20 is connected to a remote controller 4 by means of a wire or being wireless, and controls operations of instruments in the hot-water storage type heating unit 1. The controller 20 controls operations of the circulation pump 16, the solenoid valve 19, and the like based on set information which is input and set in the remote controller 4, measurement information from various sensors (not shown) in the hot-water storage type heating unit 1, and the like. The main controller 20 sends a closing signal to the solenoid valve 19 so that the solenoid valve 19 closes the return passage 18 during the operation of the circulation pump 16. The main controller 20 includes a timer 20a therein.

The heat pump unit 2 is a heating unit which heats the hot water in the hot-water storage tank 11, and is provided so as to he interposed in the second hot-water circulation circuit 13. The heat pump unit 2 leads out and heats the hot water with a low temperature or the water via the second hot-water circulation circuit 13 from the lower portion of the hot-water storage tank 11, the hot water which reaches high temperature is returned to the upper portion of the hot-water storage tank 11, and thus, the hot water in the hot-water storage tank 11 is heated. The heat pump unit 2 includes an evaporator 31, a heating medium circulation circuit 32, a compressor 33, an expansion valve 34, a condenser 35, a circulation pump 36, a heat pump controller 37, and the like.

The evaporator 31 includes a fan 39 which is rotated by driving of an electric motor 38, and heat is exchanged between air supplied by the rotating of the fan. 39 and the heating medium which passes through the heating medium circulation circuit 32 in the evaporator 31. Here, as for the heating medium, hydrofluorocarbon (HFC) which is an alternative for chlorofluorocarbon is used. However, other heating media, for example, an alternative for chlorofluorocarbon other than the hydrofluorocarbon (HFC), carbon dioxide, or the like may be used.

The compressor 33 is provided in the heating medium circulation circuit 32 on the downstream side of the evaporator 31, compresses the heating medium discharged from the evaporator 31 and makes the heating medium be of a high temperature and high pressure, and feeds the heating medium into the condenser 35. The expansion valve 34 is provided in the heating medium circulation circuit 32 on the upstream side of the evaporator 31, and releases pressure of the heating medium which is compressed by the compressor 33.

The condenser 35 heats the hot water in which the heating medium, which becomes a high pressure and high temperature due to the compressor 33, passes through the second hot-water circulation circuit 13, by heat exchange. The hot water with a low temperature or water with a low temperature which is stored in the lower portion of the hot-water storage tank 11 is introduced to the condenser 35 via the second hot-water circulation circuit 13 by the circulation pump 36, is heated by heat exchange of the condenser 35, becomes the hot water with a high temperature, and is returned to the upper portion of the hot-water storage tank 11. Thereby, the hot water with a high temperature is stored in the upper portion of the hot-water storage tank 11.

The heat pump controller 37 is connected to the main controller 20, and controls operations of the instruments in the heat pump unit 2. The heat pump controller 37 controls operations of the compressor 33, the circulation pump 36, the electric motor 38, and the like based on input information from the remote controller 4 or the main controller 20, measurement information, from various sensors (not shown) in the heat pump unit 2, and the like. Moreover, the heat pump controller 37 sends measurement information or the like from various sensors in the heat pump unit 2 to the main controller 20.

The radiator unit 3 for heating is a radiator which performs radiation of the heating medium which is heated by the liquid-liquid heat exchanger 15, and is provided so as to be interposed in the heating circulation, circuit 14. Here, the radiator unit 3 for heating is a panel type floor heater, and includes a mat-like radiation mat 41, a circulation pump 42, a heating controller 43, or the like which is provided so as to be interposed in the heating circulation circuit 14. Moreover, a warm air type heater or the like may be used as for the radiator unit 3 for heating.

The hot water which is heated by the liquid-liquid heat exchanger 15 is introduced to the radiation mat 41 via the heating circulation circuit 14 by the circulation pump 42, is radiated by the radiation mat 41, and heats the ambient air.

The heating controller 43 is connected to the main controller 20, and controls operations of the instruments in the radiator unit 3 for heating. The heating controller 43 controls operations of the circulation pump 42, and the like based on input information from the remote controller 4 or the main controller 20, measurement information from various sensors (not shown) in the radiator unit 3 for heating, and the like. In addition, the heating controller 43 sends measurement information or the like from the various sensors in the radiator unit 3 for heating to the main controller 20.

The remote controller 4 is connected so as to mutually communicate with the main controller 20, and includes an operation switch 4a to Which instructions of ON (operation) and OFF (stop) of the heating operation are operated and input, or the like. When the ON instruction from the operation switch 4a is input, the hot-water storage type heating unit 1 and the radiator unit 3 for heating become an operation state or an operation waiting state, and when the OFF instruction is input from the operation switch 4a, in principle, operation stop states of the hot-water storage type heating unit 1 and the radiator unit 3 for heating are maintained. The operation state of the heat pump unit 2 is determined by the temperature or the like of the hot water which is stored in the hot-water storage tank 11.

Hereinafter, a control operation of the hot-water storage type heating system when a user turns on the operation switch 4a of the remote controller 4 will be described with reference to a flowchart of FIG. 2. In addition, the control operation in the hot-water storage type heating unit 1 is performed by the main controller 20 via the remote controller 4. The control operations in the heat pump unit 2 and the radiator unit 3 for heating are performed by the heat pump controller 37 and the heating controller 43 respectively via the main controller 20.

If the operation switch 4a is turned on (STEP 1: YES), first, the operation of the circulation pump 42 in the radiator unit 3 for heating starts, and the heating operation starts (STEP 2). Moreover, after the electricity is turned on, the solenoid valve 19 is closed, and the return passage 18 is closed (STEP 3), the operation of the circulation pump 16 in the hot-water storage type heating unit 1 starts, and the hot water in the heating circulation circuit 14 is heated by the liquid-liquid heat exchanger 15 (STEP 4). At this time, the timer 20a is reset, and clocking starts by the tinier 20a (STEP 5).

If the operation switch 4a is turned of (STEP 6: YES), after the operation of the circulation pump 16 in the hot-water storage type heating unit 1 stops (STEP 7), electricity s turned of the solenoid valve 19 is opened, the return passage 18 communicates, and the gas accumulated in the air storage chamber 17a of the upper portion of the gas-liquid separator 17 is introduced into the hot-water storage tank 11 (STEP 8). Moreover, the operation of the circulation pump 42 in the radiator unit 3 for heating stops, and the heating operation stops (STEP 9).

If clocking by the timer 20a exceeds a predetermined time T1, for example, 3 hours (STEP 10: YES) in a state where the operation switch 4a is not turned off (STEP 6: NO), similar to the case where the operation switch 4a is turned off (STEP 6: YES), after the operation of the circulation pump 16 in the hot-water storage type heating unit 1 stops (STEP 11), electricity is turned off, the solenoid valve 19 is opened, the return passage 18 communicates, the gas accumulated in the air storage chamber 17a of the upper portion of the gas-liquid separator 17 is introduced into the hot-water storage tank 11 (STEP 12), and thereafter, the operation of the circulation pump 42 in the radiator unit 3 for heating stops, and the heating operation stops (STEP 13). At this time, the timer 20a is reset, and clocking starts by the timer 20a (STEP 14). The predetermined time T1 depends on the amount of the air which is separated by the gas-liquid separator 17 and the capacity of the air which can be accumulated in the air storage chamber 17a of the gas-liquid separator 17.

If the clocking by the timer 20a exceeds a predetermined time T2, for example, 3 minutes (STEP 15: YES), similar to the case where the operation switch 4a is turned on (STEP 1: YES), the operation of the circulation pump 42 in the radiator unit 3 for heating starts, and the heating operation restarts (STEP 2). Moreover, after the electricity is turned on, the solenoid valve 19 is closed, and the return passage 18 is closed (STEP 3), the operation of the circulation pump 16 in the hot-water storage type heating unit 1 starts, and the hot water in the heating circulation circuit 14 is heated by the liquid-liquid heat exchanger 15 (STEP 4). At this time, the timer 20a is reset, and clocking starts by the timer 20a (STEP 5). Moreover, the predetermined time T2 depends on the time in which the air accumulated in the air storage chamber 17a of the gas-liquid separator 17 is able to be returned to the hot-water storage tank 11 via the return passage 18.

As described above, since the liquid-liquid heat exchanger 15 is disposed above the hot-water storage tank 11, compared to the related art in which the liquid-liquid heat exchanger 15 is disposed on the side of the hot-water storage tank 11, not only the installation area of the hot-water storage type heating unit 1 but also the installation area of the hot-water storage type heating system is decreased.

Since the liquid-liquid heat exchanger 15 is disposed above the hot-water storage tank 11, air stays in the liquid-liquid heat exchanger 15, and the staying air flows to the first hot-water circulation circuit 12. However, the gas-liquid separator 17 is provided so as to be interposed in the first hot-water circulation circuit 12 between the liquid-liquid heat exchanger 15 and the circulation pump 16. Thereby, the air which flows in the first hot-water circulation circuit 12 is separated by the gas-liquid separator 17, the separated air is temporarily accumulated in the air storage chamber 17a of the upper portion of the gas-liquid separator 17, and thus, the air reaching the circulation pump 16 and the circulation pump 16 causing failure of air entrainment are prevented.

In addition, when the circulation pump 16 is operated, the solenoid valve 19 closes the return passage 18 through which the air separated by the gas-liquid separator 17 is returned to the hot-water storage tank 11. Thereby, when the hot water is sucked from the hot-water storage tank 11 and is supplied to the first hot-water circulation circuit 12, since the return passage 18 is closed, the air returned to the hot-water storage tank 11 from the return passage 18 is prevented from being supplied to the first hot-water circulation circuit 12 as it is.

Next, a hot-water storage type heating system, which includes the hot-water storage type heating unit 1 according to modification of the embodiment of the present invention, will be described with reference to drawings.

In the hot-water storage type heating unit 1, a check valve 19a is used as the on-off valve, and other configurations are the same as those of the above-described hot-water storage type heating unit 1. The check valve 19a closes the return passage 18 by the pump pressure only when the circulation pump 16 is operated.

Hereinafter, a control operation of the hot-water storage type heating system when a user turns on the operation switch 4a of the remote controller 4 will be described with reference to a flowchart of FIG. 3.

If the operation switch 4a is turned on (STEP 21: YES), first, the operation of the circulation pump 42 in the radiator unit 3 for heating starts, and the heating operation starts (STEP 22). Moreover, if the operation of the circulation pump 16 in the hot-water storage type heating unit 1 starts (STEP 23), the check valve 19a is closed by the pump pressure and the return passage 18 is closed (STEP 24), and the hot water in the heating circulation circuit 14 is heated by the liquid-liquid heat exchanger 15. At this time, the timer 20a is reset, and clocking starts by the timer 20a (STEP 25).

If the operation switch 4a is turned off (STEP 26: YES), the operation of the circulation pump 16 in the hot-water storage type heating unit 1 stops (STEP 27). Thereby, the check valve 19a is opened, the return passage 18 communicates, and the gas accumulated in the air storage chamber 17a of the upper portion of the gas-liquid separator 17 is introduced into the hot-water storage tank 11 (STEP 28). Moreover, the operation of the circulation pump 42 in the radiator unit 3 for heating stops, and the heating operation stops (STEP 29).

If clocking by the tinier 20a exceeds the predetermined time T1, for example, 3 hours (STEP 30: YES) in a state where the operation switch 4a is not turned off (STEP 26: NO), similar to the case where the operation switch 4a is turned of (STEP 26: YES), the operation of the circulation pump 16 in the hot-water storage type heating unit 1 stops (STEP 31). Thereby, the check valve 19a is opened, the return passage 18 communicates, the gas accumulated in the air storage chamber 17a of the upper portion of the gas-liquid separator 17 is introduced into the hot-water storage tank 11 (STEP 32). Thereafter, the operation of the circulation pump 42 in the radiator unit 3 for heating stops, and the heating operation stops (STEP 33). At this time, the timer 20a is reset, and clocking starts by the timer 20a (STEP 34).

If the clocking by the timer 20a exceeds the predetermined time T2, for example, 3 minutes (STEP 35: YES), similar to the case where the operation switch 4a is turned on (STEP 21: YES), the operation of the circulation pump 42 in the radiator unit 3 for heating starts, and the heating operation starts (STEP 22). Moreover, if the operation of the circulation pump 16 in the hot-water storage type heating unit 1 starts (STEP 23), the check valve 19a is closed by the pump pressure, the return passage 18 is closed (STEP 24), and the hot water in the heating circulation circuit 14 is heated by the liquid-liquid heat exchanger 15. At this time, the timer 20a is reset, and clocking starts by the timer 20a (STEP 25).

This hot-water storage type heating system includes the effects similar to the above-described hot-water storage type heating system.

Moreover, the hot-water storage type heating units according to the present invention are not limited to those described above. For example, in the above-described hot-water storage type heating units 1, the case is described which includes the heating circulation circuit 14 in which the radiator unit 3 for heating is provided so as to be interposed. However, the circuit in which the heating medium flows is not limited to the circulation circuit, and the heating medium performs heat exchange with the hot water, which circulates through the first hot-water circulation circuit 12, by the liquid-liquid heat exchanger 15. For example, one end may communicate with the water supply pipe 22, and the other end may be a hot-water supply circuit or the like which includes a shower head or the like.

Moreover, the case where the normally-open solenoid valve 19 or the check valve 19a is used as the on-off valve is described. However, other valves may be used as the on-off valve as long as it is possible to close the return passage 18 during the operation of the circulation pump 16.

In addition, the case Where the hot water in the hot-water storage tank 11 is heated using the heat pump unit 2 is described. However, a means which heats the hot water in the hot-water storage tank 11 is not limited. For example, a heating source such as a heater which is provided in the hot-water storage tank 11 and directly heats the hot water in the hot-water storage tank 11 may be used. Moreover, a heating means such as a burner, which heats the hot water which circulates through the second hot-water circulation circuit 13, may he used.

The invention claimed is:

1. A hot-water storage type heating unit, comprising:
  a hot-water storage tank which stores hot water in an inner portion thereof;
  a hot-water circulation circuit through which the hot water stored in the hot-water storage tank circulates;
  a radiation circuit to which a radiator is connected and in which a heating medium flows;
  a liquid-liquid heat exchanger which exchanges heat between the hot water which circulates through the hot-water circulation circuit and the heating medium which flows in the radiation circuit, and is disposed above the hot-water storage tank;
  a pump which is disposed in the hot-water circulation circuit on the downstream side of the liquid-liquid heat exchanger, and circulates the hot water in the hot-water circulation circuit;
  a gas-liquid separator which is provided so as to be interposed in the hot-water circulation circuit between the liquid-liquid heat exchanger and the pump;
  a return passage which communicates with the hot-water storage tank and the gas-liquid separator, and returns gas separated by the gas-liquid separator to the hot-water storage tank;
  an on-off valve which is provided in the return passage and opens and closes the return passage; and
  a controller controlling the on-off valve to close the return passage during operation of the pump, wherein said controller is an electronic control unit in communication with the pump and the on-off valve, and is configured to detect operation of the pump and, upon detecting operation of the pump, to control the on-off valve to close.

2. The hot-water storage type heating unit according to claim 1,
  wherein the gas-liquid separator includes an air storage chamber on an upper portion thereof.

3. The hot-water storage type heating unit according to claim 2,
  wherein a hot-water inlet port of the hot-water circulation circuit is positioned below a hot-water surface of the hot-water storage tank.

4. The hot-water storage type heating unit according to claim 1,
  wherein a hot-water inlet port of the hot-water circulation circuit is positioned below a hot-water surface of the hot-water storage tank.

5. The hot-water storage type heating unit according to claim 1,
  wherein the controller is configured to detect a stopping of operation of the pump and, upon detecting stopping of operation of the pump, to control the on-off valve to open the return passage.

6. The hot-water storage type heating unit according to claim 1,
  wherein the hot-water circulation circuit is configured such that the hot water is led out from an upper portion of the hot-water storage tank and returned to a lower portion of the hot-water storage tank, and
  the return passage is different from the hot-water circulation circuit and is dedicated to returning gas separated by the gas-liquid separator to the hot-water storage tank.

* * * * *